(12) United States Patent
Khandekar et al.

(10) Patent No.: US 12,073,728 B2
(45) Date of Patent: Aug. 27, 2024

(54) METHOD AND A SYSTEM TO AUTOMATICALLY START AND STOP A MONITORING DEVICE

(71) Applicant: Carrier Corporation, Palm Beach Gardens, FL (US)

(72) Inventors: Anup Khandekar, Telangana (IN); Ananthakrishnan N, Telangana (IN); Ramesh Babu, Telangana (IN)

(73) Assignee: CARRIER CORPORATION, Palm Beach Gardens, FL (US)

( * ) Notice: Subject to any disclaimer, the term of this patent is extended or adjusted under 35 U.S.C. 154(b) by 96 days.

(21) Appl. No.: 17/532,297

(22) Filed: Nov. 22, 2021

(65) Prior Publication Data

US 2022/0165161 A1    May 26, 2022

(30) Foreign Application Priority Data

Nov. 24, 2020   (IN) .............................. 202011051156

(51) Int. Cl.
   *G08G 1/00*       (2006.01)
   *G06Q 10/0832*   (2023.01)
   (Continued)

(52) U.S. Cl.
   CPC ......... *G08G 1/207* (2013.01); *G06Q 10/0832* (2013.01); *G06Q 10/0833* (2013.01);
   (Continued)

(58) Field of Classification Search
   CPC .... G08G 1/207; G08G 1/052; G06Q 10/0832; G06Q 10/0833; G06Q 50/30;
   (Continued)

(56) References Cited

U.S. PATENT DOCUMENTS

| 7,693,739 B2 * | 4/2010 | Schmidtberg .......... G06Q 10/06 705/333 |
| 2008/0198817 A1 * | 8/2008 | Montemurro ..... H04W 52/0216 370/338 |

(Continued)

FOREIGN PATENT DOCUMENTS

WO    2018177828 A1    10/2018

OTHER PUBLICATIONS

European Search Report for Application No. 21205900.0; Issued Mar. 14, 2022; 10 Pages.

*Primary Examiner* — Nizar N Sivji
*Assistant Examiner* — Jing Gao
(74) *Attorney, Agent, or Firm* — CANTOR COLBURN LLP

(57) ABSTRACT

A system and a method for automatically starting and/or stopping a monitoring device. The method includes detecting halt of a vehicle using a first sensor and a second sensor. The method also includes communicating with a server after detecting the halt to determine a trip assignment status of a monitoring device placed inside the vehicle. The method further includes determining if the vehicle is within a geofence of a trip starting location based on the trip assignment status of the monitoring device. The method further includes determining speed of the vehicle after the vehicle is within the geo-fence of the trip starting location. Accordingly, the monitoring device is automatically started when the speed of the vehicle reaches above a pre-determined speed.

17 Claims, 4 Drawing Sheets

(51) Int. Cl.
*G06Q 10/0833* (2023.01)
*G08G 1/052* (2006.01)
*H04W 4/02* (2018.01)
*H04W 4/021* (2018.01)
*H04W 4/029* (2018.01)

(52) U.S. Cl.
CPC ............ *G08G 1/052* (2013.01); *H04W 4/021* (2013.01); *H04W 4/027* (2013.01); *H04W 4/029* (2018.02)

(58) Field of Classification Search
CPC .......... G06Q 10/083; G06Q 10/08355; H04W 4/021; H04W 4/029; H04W 4/027; H04W 4/70; H04W 4/022; H04W 4/38; H04W 4/40; H04W 4/44; H04L 67/535
See application file for complete search history.

(56) References Cited

U.S. PATENT DOCUMENTS

| | | | |
|---|---|---|---|
| 2012/0161958 A1* | 6/2012 | Turon | G01S 19/34 340/539.3 |
| 2015/0264647 A1* | 9/2015 | Lacatus | H04W 4/02 455/574 |
| 2016/0003627 A1* | 1/2016 | Bonhomme | G01C 21/26 701/400 |
| 2018/0040224 A1* | 2/2018 | Barcala | G06F 1/3209 |

* cited by examiner

METHOD AND A SYSTEM TO AUTOMATICALLY START AND STOP A MONITORING DEVICE

FOREIGN PRIORITY

This application claims priority to Indian Patent Application No. 202011051156, filed Nov. 24, 2020, and all the benefits accruing therefrom under 35 U.S.C. § 119, the contents of which in its entirety are herein incorporated by reference.

TECHNICAL FIELD

The present disclosure generally relates to monitoring devices used in transportation systems. More particularly, the invention relates to a system and a method for automatically starting and/or stopping a monitoring device.

BACKGROUND

Perishable items or goods such as pharmaceutical products, food items or other sensitive goods need to be kept in a favorable environment to prevent them from deteriorating during transportation. To ensure that a favorable environment is maintained during transportation, monitoring devices are placed inside the vehicle used for transporting such goods. Such monitoring devices monitor ambient conditions such as temperature, pressure etc. inside the vehicle and report the monitored conditions to a server using a cellular channel. Based on the monitored conditions, an end user, such as a manufacturer, a retailer or a customer can determine the health of the goods. Based on such determination, the end user can decide if a particular good was indeed kept in a favorable environment and/or whether a particular good is safe to consume or not.

Thus, monitoring the conditions in which perishable goods have been kept while transporting is a crucial step in determining the health of such goods when they reach their destination and the monitoring devices are indispensable for making such determination. Currently, monitoring devices need to be manually started and stopped by a staff member for monitoring the ambient conditions in a trip from a start location till a destination location where the goods are transported. It is possible that the staff member may forget to start and stop the monitoring devices, thereby disabling or providing erroneous monitoring during the trip.

In view of the afore-mentioned problems, there is a need of an effective and efficient system and a method for automatically starting and/or stopping a monitoring device. There is also a requirement to eliminate the need to manually start and/or stop a monitoring device. In order to solve the problems in the existing solutions, a system and a method are disclosed.

SUMMARY

Various embodiments describe a method for automatically starting and/or stopping a monitoring device. The method comprises the steps of detecting halt of a vehicle using a first sensor and a second sensor. The method also comprises the steps of communicating with a server after detecting the halt to determine a trip assignment status of a monitoring device placed inside the vehicle. The method further comprises determining if the vehicle is within a geofence of a trip starting location based on the trip assignment status and determining speed of the vehicle within the geo-fence of the trip starting location. Accordingly, the monitoring device is automatically started when the speed of the vehicle reaches above a pre-determined speed.

In an embodiment of the invention, the method also comprises the steps of turning-on a cellular network to communicate with the server and turning-off the cellular network after the trip assignment status of the monitoring device is determined from the server. Further, the method also comprises the steps of activating a global positioning system (GPS) to determine if the vehicle is within the geofence of the trip starting location while the cellular network is turned-off and deactivating the GPS after determining if the vehicle is within the geofence of the trip starting location.

In a different embodiment of the invention, the cellular network is turned on and off and the GPS is activated and deactivated for power optimization to automatically start and stop the monitoring device.

In an embodiment of the invention, the trip assignment status of the monitoring device includes a positive status when a trip is assigned to the monitoring device and a negative status when no trip is assigned to the monitoring device.

In another embodiment of the invention, the determination of the vehicle within the geofence of the trip starting location is performed only when the trip assignment status of the monitoring device corresponds to the positive status.

In yet another embodiment of the invention, the first sensor is an accelerometer and the second sensor is a gyroscope.

In another embodiment of the invention, the speed of the vehicle is determined using the accelerometer and the gyroscope.

In still another embodiment of the invention, the automatic start of the monitoring device initiates real-time monitoring of one or more parameters inside a temperature-controlled unit placed inside the vehicle. Also, the monitoring device is placed inside the temperature-controlled unit.

In a different embodiment of the invention, the method also comprises steps of communicating with the server on detection of the halt to determine a trip arriving status of the monitoring device. The method also comprises steps of determining if the vehicle is within a geofence of a trip destination location based on the trip arriving status of the monitoring device. Accordingly, the monitoring device is automatically stopped when the vehicle is within the geofence of the trip destination location.

In yet another embodiment of the invention, the automatic stop of the monitoring device disables monitoring of one or more parameters inside a temperature-controlled unit placed inside the vehicle.

Various embodiments of the invention describe a system for automatically starting and/or stopping a monitoring device. The system comprises a first sensor, a second sensor, a communication unit, a determination unit and a switch. The first sensor and the second sensor are configured to detect halt of a vehicle. The communication unit is configured to communicate with a server after detecting the halt to determine a trip assignment status of a monitoring device placed inside the vehicle. The determination unit is configured to determine if the vehicle is within a geofence of a trip starting location based on the trip assignment status of the monitoring device. Further, the first sensor and the second sensor are configured to determine speed of the vehicle after the vehicle is within the geo-fence of the trip starting location. The switch is configured to automatically start the monitoring device when the speed of the vehicle reaches above a pre-determined speed.

In a different embodiment of the invention, the communication with the server is achieved by turning-on a cellular network and the cellular network is tuned-off after the trip assignment status of the monitoring device is determined from the server.

In yet another embodiment of the invention, a global positioning system (GPS) is activated to determine if the vehicle is within the geofence of the trip starting location while the cellular network is turned-off and the GPS is de-activated after determining if the vehicle is within the geofence of the trip starting location.

In an embodiment of the invention, the cellular network is turned on and off and the GPS is activated and deactivated for power optimization to automatically start and stop the monitoring device.

In yet another embodiment of the invention, the trip assignment status of the monitoring device includes a positive status when a trip is assigned to the monitoring device and a negative status when no trip is assigned to the monitoring device.

In another embodiment of the invention, the determination of the vehicle within the geofence of the trip starting location is performed only when the trip assignment status of the monitoring device corresponds to the positive status.

In yet another embodiment of the invention, the first sensor is an accelerometer and the second sensor is a gyroscope.

In an embodiment of the invention, the automatic start of the monitoring device initiates real-time monitoring of one or more parameters inside a temperature-controlled unit placed inside the vehicle, and wherein the monitoring device is placed inside the temperature-controlled unit.

In yet another embodiment of the invention, the communication unit is configured to communicate with the server on detection of the halt to determine a trip arriving status of the monitoring device. Also, the determination unit is configured to determine if the vehicle is within a geofence of a trip destination location based on the trip arriving status of the monitoring device. The switch is configured to automatically stop the monitoring device when the vehicle is within the geofence of the trip destination location.

In another different embodiment of the invention, a computer readable medium is disclosed for automatically starting and/or stopping a monitoring device. The computer readable medium comprises one or more processors and a memory is coupled to the one or more processors, the memory stores instructions executed by the one or more processors. The one or more processors are configured to detect halt of a vehicle using a first sensor and a second sensor. The one or more processors are further configured to communicate with a server after detecting the halt to determine a trip assignment status of a monitoring device placed inside the vehicle and to determine if the vehicle is within a geofence of a trip starting location based on the trip assignment status of the monitoring device. The one or more processors are also configured to determine speed of the vehicle after the vehicle is within the geo-fence of the trip starting location and automatically start the monitoring device when the speed of the vehicle reaches above a pre-determined speed.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

Other aspects, advantages, and salient features of the invention will become apparent to those skilled in the art from the following detailed description, which taken in conjunction with the annexed drawings, discloses exemplary embodiments of the invention.

BRIEF DESCRIPTION OF THE DRAWINGS

Corresponding reference numerals indicate corresponding parts throughout the drawings.

DETAILED DESCRIPTION

Figure 1:
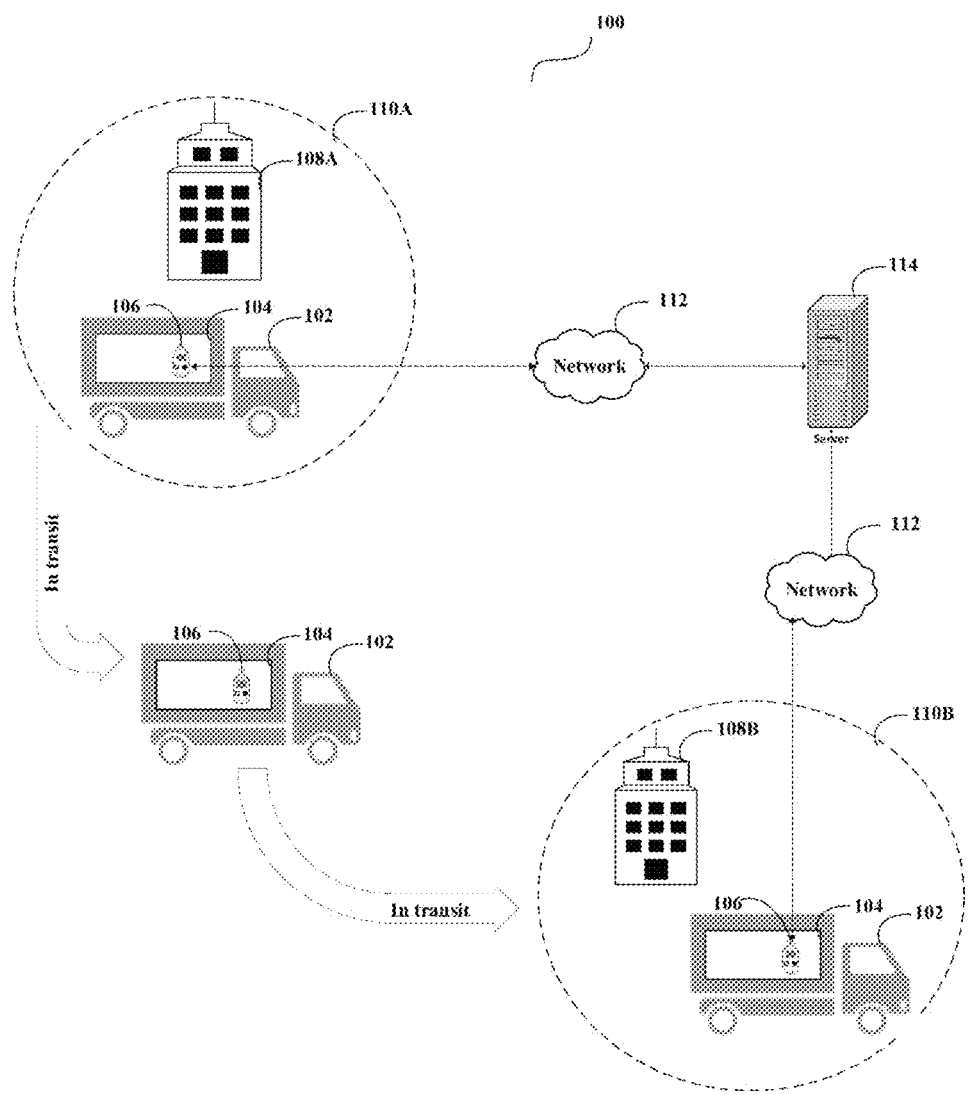
FIG. 1 depicts an exemplary system architecture according to an exemplary embodiment of the invention.

Described herein is the technology with a system and a method for automatically starting and/or stopping a monitoring device. The monitoring device may be placed inside a temperature-controlled unit and one or more goods (such as pharmaceutical products, food items or other sensitive goods) are also placed inside the temperature-controlled unit along with the monitoring device. Further, the temperature-controlled unit having the monitoring device and the goods is placed inside a vehicle. The monitoring device may be in an 'on/awake' mode but is currently not started to monitor one or more parameters in a trip while transporting the goods.

The vehicle may be present at a trip starting location (may be, a packaging facility) having a premises from where the vehicle will start the trip. The vehicle may be moved and stopped within the premises at different stoppages for various security checks and other formalities before the vehicle finally proceeds for a trip destination location. When the vehicle deaccelerates and stops inside the premises, a halt is detected using sensor/s. Upon detection of the halt, a communication with a server is established through a network to determine a trip assignment status. The monitoring device may determine if the vehicle is within a geofence of the trip starting location when the trip assignment status corresponds to a positive status. The vehicle may start moving from the halt location. And in case the vehicle is within the geofence, the monitoring device may determine speed of the vehicle. When the speed of the vehicle reaches above a pre-determined speed, the monitoring device is automatically started for monitoring the one or more parameters during the trip. In the same way, the monitoring device is automatically stopped when the vehicle is within a geofence of a trip destination location.

As used herein, the vehicle may be a road vehicle (such as a two-wheeler, a three-wheeler, a four-wheeler), an air vehicle or a water vehicle (such as a ship) or any vehicle that is well known in the art.

As used herein, the monitoring device may be a device capable of monitoring the one or more parameters inside the temperature-controlled unit. The monitoring device may comprise, but is not limited to, sensors such as accelerometer, gyroscope, temperature sensor, global position system (GPS) etc., a communication unit, a determination unit, a processor, and a memory. Functions and operations performed by the monitoring device are described in details below.

As used herein, the one or more parameters monitored by the monitoring device may be temperature, light, humidity, carbon-dioxide, pressure, carbon monoxide or any such parameters that is well known in the art.

As used herein, the temperature-controlled unit may be a refrigerated container or reefer placed inside the vehicle. The temperature-controlled unit may contain goods as well the monitoring device.

As used herein, the server may be a remote storage, a database, a cloud or any such remote memory that is well known in the art.

As used herein, the network may be any cellular network (such as Global System for Mobile communication (GSM) network, Code-Division Multiple Access (CDMA) network, Long-Term Evolution (LTE) network), a Wi-Fi network, a bluetooth network, a ZigBee network, a near-field communication network, or any such network that is obvious to a person skilled in the art.

FIG. 1 depicts an exemplary system architecture 100 according to an exemplary embodiment of the invention. As depicted in FIG. 1, a vehicle 102 may have a temperature-controlled unit 104 and the temperature-controlled unit 104 may contain a monitoring device 106. The temperature-controlled unit 104 may also contain goods (not shown) such as perishable items and pharmaceuticals products along with the monitoring device 106. The vehicle 102 is currently at a packaging facility 108A which can be considered as a trip starting location for the vehicle 102. Such packaging facility 108A may have a premises within which the vehicle 102 can be moved and stopped at different stoppages for various security checks and other formalities. Although, reference numeral 108A is discussed herein as a packaging facility, but it is understood for a person skilled in the art that reference numeral 108A can be a manufacturing facility or any such facility provided by a manufacturer of the goods and from where goods can be transported.

Furthermore, the monitoring device 106 may monitor one or more parameters inside the temperature-controlled unit 104. At this stage, the monitoring device 106 is in an awake or an ON mode but has not started monitoring the one or more parameters inside the temperature-controlled unit 104. As used herein, the awake mode of the monitoring device 106 refers to a state when the monitoring device is operational but does not start monitoring the one or more parameters. Although, only one monitoring device 106 is shown in FIG. 1 being placed inside the temperature-controlled unit 104, but it is understood to a person skilled in the art that any number of monitoring devices can be placed inside the temperature-controlled unit 104. It is also noted that the monitoring device may also be in OFF mode and may be activated to the awake mode on determination of a trip assignment status.

When the vehicle 102 starts moving inside the premises of the packaging facility 108A and halts/stops at any place, the monitoring device 106 detects such halt/stop made by the vehicle 102 using a first sensor and a second sensor. In an exemplary embodiment, the first sensor is an accelerometer and the second sensor is a gyroscope attached to the vehicle. In an exemplary embodiment, the monitoring device 106 may detect the halt of the vehicle 102 using an accelerometer and a gyroscope of the monitoring device 106. In an alternative exemplary embodiment, the monitoring device 106 may receive halt detection from an accelerometer and a gyroscope of the vehicle 102. Further, the vehicle 102 is said to be at halt or stopped only when the vehicle 102 is not accelerating or not moving and is at zero speed. Also, using both the accelerometer and the gyroscope for detecting the halt, accuracy for detection of the halt is increased.

In case, the monitoring device 106 does not detect any halt, then the monitoring device 106 does not take any action and may go to a sleep mode. Upon detecting the halt, the monitoring device 106 may turn-on a cellular network to communicate with a server 114 through a network 112. The communication to the server 114 is done by the monitoring device 106 to determine a trip assignment status of the monitoring device 106 placed inside the vehicle 102. For this, the monitoring device 106 may transmit a unique identifier associated with the monitoring device 106 to the server 114 through the network 112. Further, the server 114 may have all information and updates regarding a trip assignment status of each monitoring device used by the manufacturer in a particular facility. The information and updates at the server 114 may be updated at regular intervals by a staff member or the manufacturer of the goods. On receiving the unique identifier associated with the monitoring device 106 from the monitoring device 106, the server 114 may find a latest trip assignment status of the monitoring device 106 by looking into the information stored in the server 114. Then, the server 114 may transmit the latest trip assignment status of the monitoring device 106 to the monitoring device 106 through the network 112. Once the monitoring device 106 receives the latest trip assignment status from the server 114, the monitoring device 106 may turn-off the cellular network. The trip assignment status of the monitoring device 106 may include a positive status, a negative status, and the trip starting location. In an exemplary embodiment, the positive status of the monitoring device 106 may refer to a status when a trip is assigned to the monitoring device 106. In an exemplary embodiment, the negative status of the monitoring device 106 may refer to a status when no trip is assigned to the monitoring device 106.

When the latest trip assignment status of the monitoring device 106 includes a negative status i.e. a trip is not assigned to the monitoring device 106, the monitoring device 106 does not perform any further action may go to the sleep mode. In case the latest trip assignment status of the monitoring device 106 includes a positive status i.e. a trip is assigned to the monitoring device 106, the monitoring device 106 may determine if the vehicle 102 is within a geofence 110A of the trip starting location i.e. the packaging facility 108A. For determining if the vehicle 102 is within the geofence 110A of the trip starting location 108A, the monitoring device 106 may activate its global positioning system (GPS). Based on a current location of the vehicle 102, the monitoring device 106 may determine that if the vehicle 102 is within the geofence 110A of the trip starting location 108A as shown in FIG. 1. As used herein, the geofence 110A of the packaging facility/trip starting location 108A is a virtual boundary that is defined or set by the staff member or the manufacturer of the goods. Information regarding the geofence 110A of the trip starting location is also updated on the monitoring device 106 over a period of time by the server 114 or by manually feeding such information at the monitoring device 106 by the staff member or the manufacturer of the goods. If the vehicle 102 is within the geofence 110A of the trip starting location 108A, the monitoring device 106 deactivates it's GPS. It is to be noted here that the monitoring device 106 activates its GPS while the cellular network is turned-off by the monitoring device 106. By iteratively turning on and off the cellular network and activating and deactivating the GPS by the monitoring device 106, power optimization of a battery of the monitoring device 106 is achieved by the monitoring device 106 to automatically start and stop the monitoring device 106.

When the vehicle 102 is not determined within the geofence 110A of the trip starting location 108A, the monitoring device 106 does not perform any further action and may go to the sleep mode. When the vehicle 102 is determined within the geofence 110A of the trip starting location 108A, the monitoring device 106 may determine speed of the vehicle 102. Further, the speed of the vehicle 102 is determined using the first sensor and the second sensor as explained above. By using both the accelerometer and the gyroscope for determining speed of the vehicle 102, accuracy for speed detection is increased.

The monitoring device 106 may compare the determined speed of the vehicle 102 with a pre-determined speed. Information regarding the pre-determined speed may be stored in a memory of the monitoring device 106 or at the server 114 and may be provided to the monitoring device 106 from the server 114. In an event the monitoring device 106 determines that the speed of the vehicle 102 has not reached above the pre-determined speed, the monitoring device 106 does not perform any further action and may go to the sleep mode. In an event the monitoring device 106 determines that the speed of the vehicle 102 has reached above the pre-determined speed, the monitoring device 106 may be automatically started. In an exemplary embodiment, the pre-determined speed (i.e. speed limit) is 20 miles per hour (mph). Keeping the pre-determined speed of the vehicle 102 at 20 mph helps in determining that the vehicle 102 has started moving to go out of the geofence 110A of the trip starting location 108A as the speed limit for moving the vehicle 102 inside the premises or the geofence 110A of the trip starting location 108A is below 20 mph. Such pre-determined speed or the speed limit may be defined by the staff member or the manufacturer of the goods. Moreover, the automatic start of the monitoring device 106 may initiate or enable real-time monitoring of the one or more parameters inside the temperature-controlled unit 104 placed inside the vehicle 102.

After the vehicle 102 moves outside the geofence 110A of the trip starting location 108A, the vehicle 102 can be said to be "in-transit" or can be said to be "on-the-way" as shown in FIG. 1. The vehicle 102 may be intended to reach a trip destination location i.e. a distribution facility or a retailer facility 108B. Outside the geofence 110A, whenever the vehicle 102 halts, the monitoring device 106 may detect such halts using the sensors and on detection of the halt, the monitoring device 106 may again turn-on the cellular network to communicate with the server 114 through a network 112 to determine a latest trip arriving status. The server 114 may then transmit the latest trip arriving status to the monitoring device 106. In an exemplary embodiment, the latest trip arriving status may include the trip destination location. After receiving the latest trip arriving status from then server 114, the monitoring device 106 may again turn-off the cellular network. Further, the monitoring device 106 may determine if the vehicle 102 is within a geofence 110B of the trip destination location or the distribution facility 108B. For this, the monitoring device 106 may determine if the vehicle 102 is within the geofence 110B of the trip destination location 108B by turning-on the GPS and subsequently turning-off the GPS as explained above. In case the monitoring device 106 determines that the vehicle 102 is not within or outside the geofence 110B, the monitoring device 106 does not perform any action. If the monitoring device 106 determines that the vehicle 102 is within the geofence 110B, the monitoring device 106 may automatically stop the monitoring device 106. As a result, the automatic stop of the monitoring device 106 disables monitoring of the one or more parameters inside the temperature-controlled unit 104 placed inside the vehicle 102.

In addition, the present invention encompasses the monitoring device 106 to continue detecting halt/s outside the geofences 110A and 110B. On detection of halts outside the geofences 110A and 110B, the monitoring device 106 may again communicate with the server 114 and may iteratively determine if the vehicle is within the geofences 110A and 110B or not. This would help in exact and more accurate starting and/or stopping of the monitoring device 106 at desired locations i.e. the trip starting location 108A and the trip destination location 108B, respectively. It will also help the monitoring device to differentiate between the traffic outside the geofence during transit.

By automatically enabling and disabling the monitoring device 106 to start and stop monitoring of the one or more parameters inside the temperature-controlled unit 104, the monitoring device 106 does not need to be manually started and/or stopped for monitoring the one or more parameters inside the temperature-controlled unit 104. Further, by employing the present invention, data related to monitoring of the one or more parameters for the temperature-controlled unit 104 is always available and not missed by virtue of any human error. Moreover, there is no need of any staff member to manually start and/or stop the monitoring device 106 for monitoring the one or more parameters inside the temperature-controlled unit 104.

Figure 2:
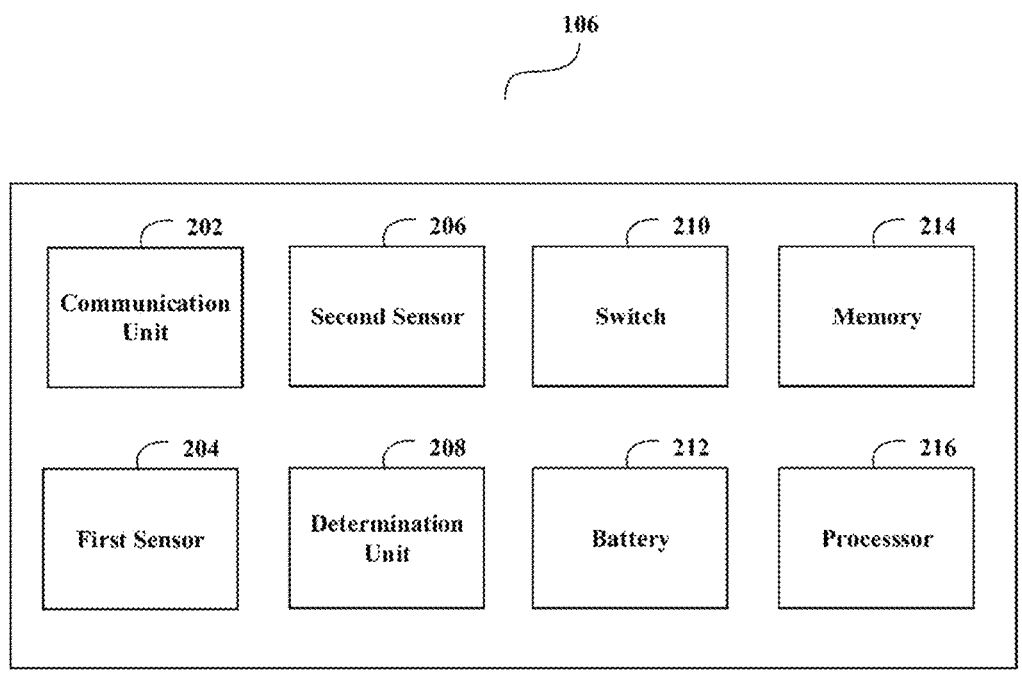
FIG. 2 depicts block diagram of different components of an exemplary monitoring device according to an exemplary embodiment of the invention.

FIG. 2 depicts block diagram of different components of an exemplary monitoring device 106 according to an exemplary embodiment of the invention. The monitoring device 106 may comprise of, but is not limited to, a communication unit 202, a first sensor 204, a second sensor 206, a determination unit 208, a switch 210, a battery 212, a memory 214, and/or a processor 216. The first sensor 204 and the second sensor 206 may be configured to detect halt of a vehicle 102. On detecting the halt, the first sensor 204 and the second sensor 206 may communicate the halt to the communication unit 202. The communication unit 202 may be configured to communicate with a server 114 through a network 112 after detection of the halt to determine a trip assignment status of the monitoring device 106 placed inside the vehicle 102. The communication unit 202 may also communicate the trip assignment status to the determination unit 208 in case of a positive status. The determination unit 208 may be configured to determine if the vehicle 102 is within a geofence 110A of a trip starting location 108A based on the trip assignment status of the monitoring device 106. For this, the determination unit 208 may use global positioning system (GPS) for determining if the vehicle 102 is within the geofence 110A. The determination unit 208 may also communicate with the first sensor 204 and the second sensor 206 if the vehicle 102 is found to be within the geofence 110A. The first sensor 204 and the second sensor 206 may be configured to determine speed of the vehicle 102 after the vehicle is within the geo-fence 110A of the trip starting location 108A. The first sensor 204 and the second sensor 206 may communicate with the processor 216 that compares the determined speed of the vehicle 102 with a pre-determined speed. The processor 216 may communicate with the switch 210 when the speed of the vehicle 102 reaches above the pre-determined speed. The switch 210 may be configured to automatically start the monitoring device 106 when the speed of the vehicle 102 reaches above the pre-determined speed. In an exemplary embodiment, the switch 210 may an electro-mechanical switch, a mechanical switch, a hardware switch, a software switch, a combination of hardware-software switch, or any such switch that is well known in the art.

Furthermore, the communication unit 202 may be configured to communicate with the server 114 on detection of the halt to determine a trip arriving status of the monitoring device 106 as explained above. The determination unit 208 may be configured to determine if the vehicle 102 is within a geofence 110B of a trip destination location 108B based on the trip arriving status of the monitoring device 106 as explained above. Also, the switch 210 may be configured to automatically stop the monitoring device 106 when the vehicle 102 is within the geofence 110B of the trip destination location 108B.

The battery 212 may be configured to provide power to the monitoring device 106 in order to keep the monitoring device 106 operational. The memory 214 may be configured to store the trip assignment status, the trip arriving status, the trip starting location 108A, the trip destination location 108B, information related to the geofences 110A and 110B, monitored parameters, the pre-determined speed and any such information. The processor 216 may be configured to perform operations and functions as described herein.

Moreover, the communication unit 202, the first sensor 204, the second sensor 206, the determination unit 208, the switch 210, the battery 212 and/or the memory 214 may be communicably coupled with the processor 216. The different units described herein are exemplary. The invention may be performed using one or more units. For example, the tasks executed by the communication unit 202, the first sensor 204, the second sensor 206, the determination unit 208, the switch 210, the battery 212 the memory 214 and/or the processor 216 may be performed by a single unit. Alternatively, more number of units as described herein may be used to perform the present invention.

Figure 3:
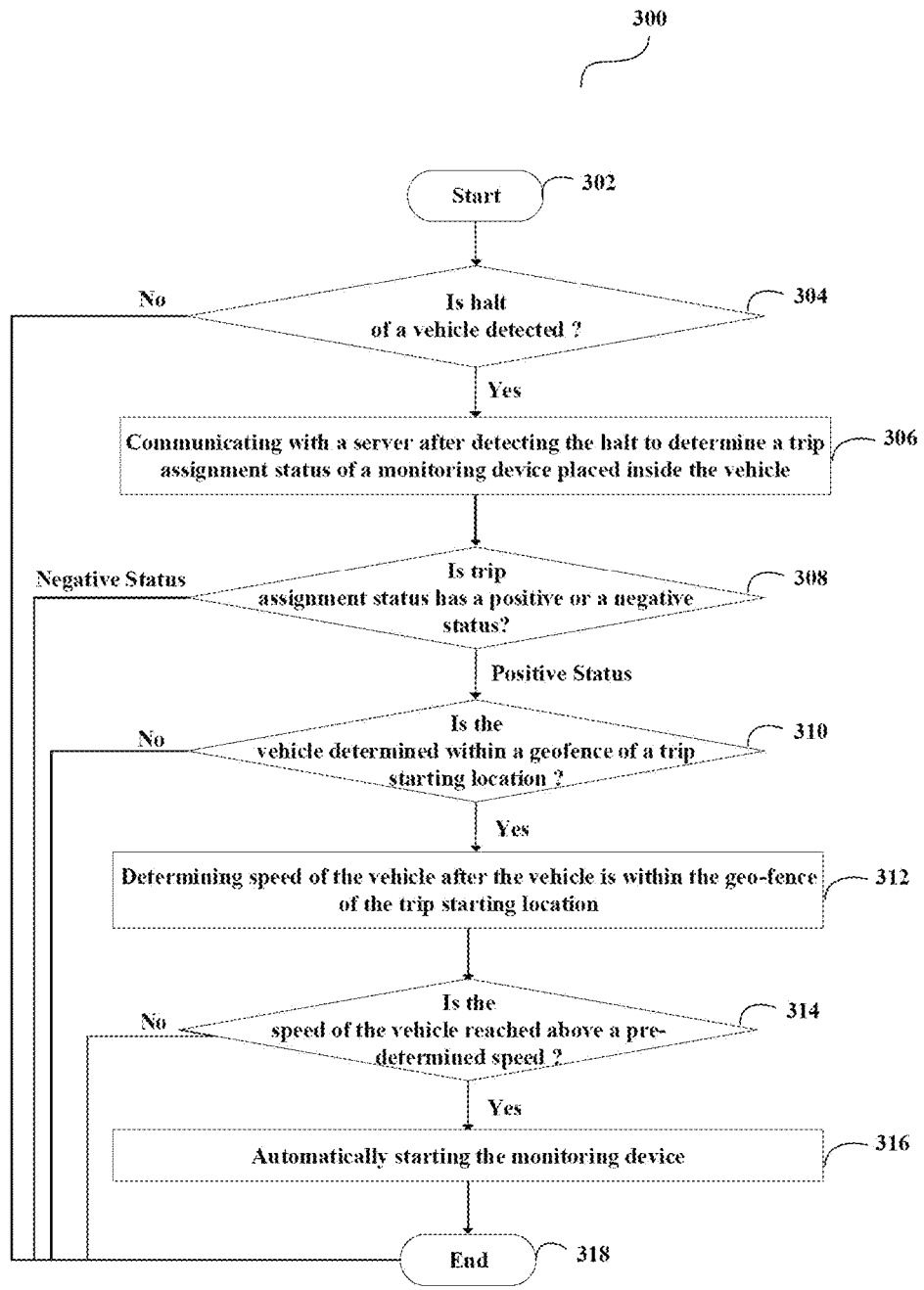
FIG. 3 depicts an exemplary flowchart illustrating a method for automatically starting a monitoring device to perform the invention according to an exemplary embodiment of the invention.

FIG. 3 depicts a flowchart outlining the features of the invention in an exemplary embodiment of the invention. The method flowchart 300 describes a method for automatically starting a monitoring device 106. The method flowchart 300 starts at step 302.

At step 304, using a first sensor 204 and a second sensor 206, the monitoring device 106 may detect halt of a vehicle 102. In case, the monitoring device 106 detects the halt, the method 300 moves to step 306. And if no halt is detected, the method 300 ends at step 318. This has been discussed in greater details in FIG. 1 above.

At step 306, the monitoring device 106 may communicate with a server 114 after detecting the halt to determine a trip assignment status of the monitoring device 106 placed inside the vehicle 102. The trip assignment status may include a positive status and/or a negative status. This has been discussed in greater details in FIG. 1 above.

At step 308, if the monitoring device 106 determines that the trip assignment status received from the server 114 includes the positive status, then method 300 moves to step 310. And, if the monitoring device 106 determines that the trip assignment status includes the negative status, the method 300 ends at step 318. This has been discussed in greater details in FIG. 1 above.

At step 310, in case the monitoring device 106 determines that the trip assignment status includes the positive status, the monitoring device 106 may determine if the vehicle 102 is within a geofence 110A of a trip starting location 108A. If the vehicle 102 is determined within the geofence 110A of the trip starting location 108A, then method 300 moves to step 312. If the vehicle 102 is not determined within the geofence 110A of the trip starting location 108A, then method 300 ends at step 318. This has been discussed in greater details in FIG. 1 above.

At step 312, in case the monitoring device 106 determines that the vehicle 102 is within the geofence 110A of the trip starting location 108A, the monitoring device 106 may determine speed of the vehicle 102. This has been discussed in greater details in FIG. 1 above.

At step 314, the monitoring device 106 may compare the determined speed of the vehicle 102 to determine if the speed of the vehicle 102 has reached above a pre-determined speed. If the speed of the vehicle 102 has reached above the pre-determined speed, then method 300 moves to step 316. And if the speed of the vehicle 102 has not reached above the pre-determined speed, the method 300 ends at step 318. This has been discussed in greater details in FIG. 1 above.

At step 316, in case the speed of the vehicle 102 has reached above the pre-determined speed, then the monitoring device 106 may automatically start the monitoring device 106 for initiating or enabling real-time monitoring of one or more parameters inside a temperature-controlled unit 104 placed inside the vehicle 102. This has been discussed in greater details in FIG. 1 above. Then, the method 300 may end at step 318.

Figure 4:
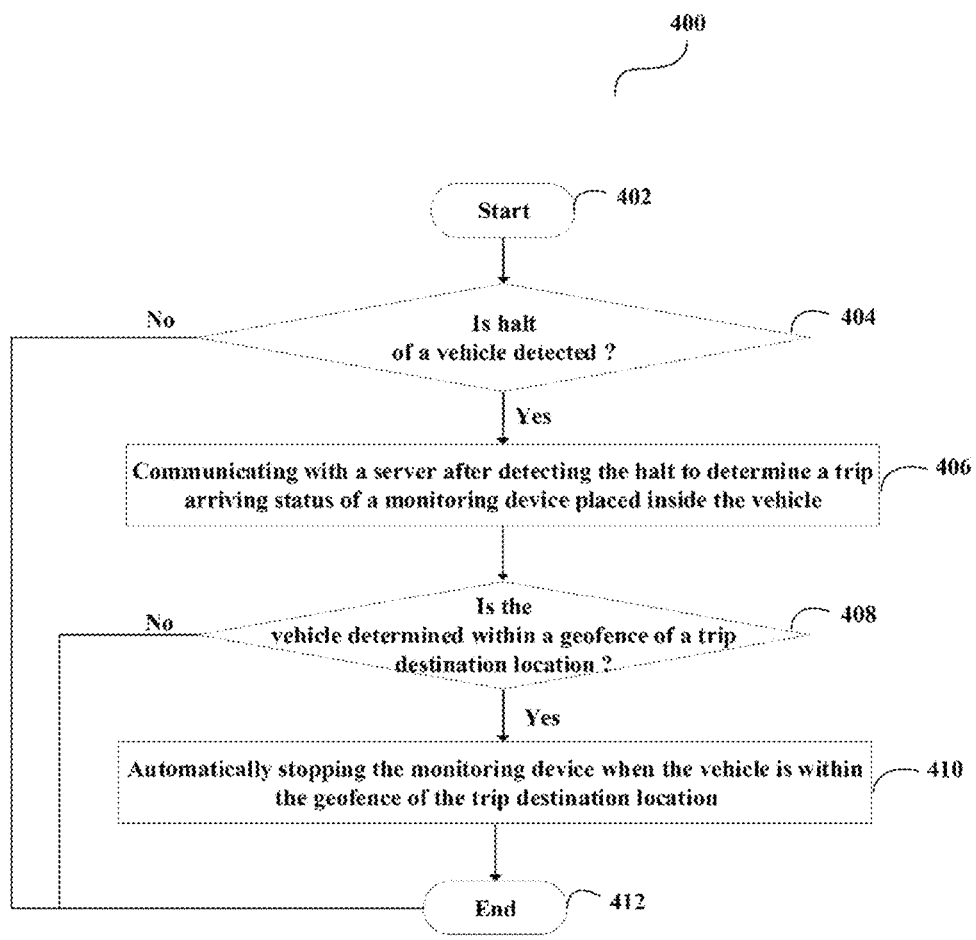
FIG. 4 depicts an exemplary flowchart illustrating a method for automatically stopping a monitoring device to perform the invention according to an exemplary embodiment of the invention.

FIG. 4 depicts a flowchart outlining the features of the invention in an exemplary embodiment of the invention. The method flowchart 400 describes a method for automatically stopping a monitoring device 106. The method flowchart 400 starts at step 402.

At step 404, using a first sensor 204 and a second sensor 206, the monitoring device 106 may detect halt of a vehicle 102. In case, the monitoring device 106 detects the halt, the method 400 moves to step 406. And if no halt is detected, the method 400 ends at step 412. This has been discussed in greater details in FIG. 1 above.

At step 406, the monitoring device 106 may communicate with a server 114 after detecting the halt to determine a trip arriving status of the monitoring device 106 placed inside the vehicle 102. As explained above, the trip arriving status may include the trip destination location. This has been discussed in greater details in FIG. 1 above.

At step 408, based on the trip arriving status, the monitoring device 106 may determine if the vehicle 102 is within a geofence 110B of a trip destination location 108B. If the vehicle 102 is determined within the geofence 110B of the trip destination location 108B, then method 400 moves to step 410. If the vehicle 102 is not determined within the geofence 110B of the trip destination location 108B, then method 400 ends at step 412. This has been discussed in greater details in FIG. 1 above.

At step 410, in case the vehicle 102 is determined within the geofence 110B of the trip destination location 108B, then the monitoring device 106 may automatically stop the monitoring device 106 for disabling real-time monitoring of one or more parameters inside a temperature-controlled unit 104 placed inside the vehicle 102. This has been discussed in greater details in FIG. 1 above. Then, the method 400 may end at step 412.

In one embodiment of the invention, the invention can be operated using the one or more computer readable devices. The one or more computer readable devices can be associated with a monitoring device 106. A computer readable medium comprises one or more processors and a memory coupled to the one or more processors, the memory stores instructions executed by the one or more processors. The one or more processors is configured to detect halt of a vehicle 102 using a first sensor 204 and a second sensor 206. The one or more processors is also configured to communicate with a server 114 after detecting the halt to determine a trip assignment status of a monitoring device 106 placed inside the vehicle 102. The one or more processors is also configured to determine if the vehicle 102 is within a geofence 110A of a trip starting location 108A based on the trip assignment status of the monitoring device 106. The one or more processors is further configured to determine speed of the vehicle 102 after the vehicle 102 is within the geo-fence 110A of the trip starting location 108A. The one or more processors is also configured to automatically start the monitoring device 106 when the speed of the vehicle 102 reaches above a pre-determined speed.

The present invention is applicable in various industries/fields such as pharmaceutical industry, transportation industry, delivery management industry, manufacturing, distribution and packaging industry and any such industry/field that is well known in the art and where the monitoring devices 106 are used.

The embodiments of the invention discussed herein are exemplary and various modification and alterations to a person skilled in the art are within the scope of the invention.

Exemplary computer readable media includes flash memory drives, digital versatile discs (DVDs), compact discs (CDs), floppy disks, and tape cassettes. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. Computer storage media are tangible and mutually exclusive to communication media. Computer storage media are implemented in hardware and exclude carrier waves and propagated signals. Computer storage media for purposes of this invention are not signals per se. Exemplary computer storage media include hard disks, flash drives, and other solid-state memory. In contrast, communication media typically embody computer readable instructions, data structures, program modules, or other data in a modulated data signal such as a carrier wave or other transport mechanism and include any information delivery media.

Although described in connection with an exemplary computing system environment, examples of the invention are capable of implementation with numerous other general purpose or special purpose computing system environments, configurations, or devices.

Examples of the invention may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the invention may be implemented with any number and organization of such components or modules. For example, aspects of the invention are not limited to the specific computer-executable instructions or the specific components or modules illustrated in the Figures and described herein. Other examples of the invention may include different computer-executable instructions or components having more or less functionality than illustrated and described herein. Aspects of the invention transform a general-purpose computer into a special-purpose computing device when configured to execute the instructions described herein.

The order of execution or performance of the operations in examples of the invention illustrated and described herein is not essential, unless otherwise specified. That is, the operations may be performed in any order, unless otherwise specified, and examples of the invention may include additional or fewer operations than those disclosed herein. For example, it is contemplated that executing or performing a particular operation before, contemporaneously with, or after another operation is within the scope of aspects of the invention.

As it employed in the subject specification, the term "controller" can refer to substantially any processor or computing processing unit or device comprising, but not limited to comprising, a direct digital control of a HVAC system, a zone controller of the HVAC system, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

When introducing elements of aspects of the invention or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C".

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. A method comprising:
   detecting halt of a vehicle using a first sensor and a second sensor;
   communicating with a server after detecting the halt to determine a trip assignment status of a monitoring device placed inside the vehicle;
   determining if the vehicle is within a geofence of a trip starting location based on the trip assignment status of the monitoring device;
   determining speed of the vehicle after the vehicle is within the geo-fence of the trip starting location; and
   automatically starting the monitoring device when the speed of the vehicle reaches above a pre-determined speed,
   wherein the monitoring device is configured to be enabled and disabled in order to start and stop monitoring of one or more parameters inside a temperature-controlled unit, such that automatically starting the monitoring devices starts monitoring the one or more parameters inside the temperature-controlled unit of the vehicle;
   the method further comprising:
   turning-on a cellular network to communicate with the server;
   turning-off the cellular network after the trip assignment status of the monitoring device is determined from the server;
   activating a global positioning system (GPS) to determine if the vehicle is within the geofence of the trip starting location while the cellular network is turned-off; and
   deactivating the GPS after determining if the vehicle is within the geofence of the trip starting location.

2. The method of claim 1, wherein the cellular network is turned on and off and the GPS is activated and deactivated for power optimization to automatically start and stop the monitoring device.

3. The method of claim 1, wherein the trip assignment status of the monitoring device includes a positive status when a trip is assigned to the monitoring device and a negative status when no trip is assigned to the monitoring device.

4. The method of claim 3, wherein the determination of the vehicle within the geofence of the trip starting location is performed only when the trip assignment status of the monitoring device corresponds to the positive status.

5. The method of claim 1, wherein the first sensor is an accelerometer and the second sensor is a gyroscope.

6. The method of claim 5, wherein the speed of the vehicle is determined using the accelerometer and the gyroscope.

7. The method of claim 1, wherein the automatic start of the monitoring device initiates real-time monitoring of one or more parameters inside the temperature-controlled unit placed inside the vehicle, and wherein the monitoring device is placed inside the temperature-controlled unit.

8. The method of claim 1, further comprising:
   communicating with the server on detection of the halt to determine a trip arriving status of the monitoring device;
   determining if the vehicle is within a geofence of a trip destination location based on the trip arriving status of the monitoring device; and
   automatically stopping the monitoring device when the vehicle is within the geofence of the trip destination location.

9. The method of claim 8, wherein the automatic stop of the monitoring device disables monitoring of one or more parameters inside a temperature-controlled unit placed inside the vehicle.

10. A system comprising:
    a first sensor and a second sensor configured to detect halt of a vehicle;
    a communication unit configured to communicate with a server after detecting the halt to determine a trip assignment status of a monitoring device placed inside the vehicle;
    a determination unit configured to determine if the vehicle is within a geofence of a trip starting location based on the trip assignment status of the monitoring device;
    the first sensor and the second sensor configured to determine speed of the vehicle after the vehicle is within the geo-fence of the trip starting location; and
    a switch configured to automatically start the monitoring device when the speed of the vehicle reaches above a pre-determined speed,
    wherein the monitoring device is configured to be enabled and disabled in order to start and stop monitoring of one or more parameters inside a temperature-controlled unit, such that automatically starting the monitoring devices starts monitoring the one or more parameters inside the temperature-controlled unit of the vehicle;
    the monitoring device is further configured to perform:
    turning-on a cellular network to communicate with the server;
    turning-off the cellular network after the trip assignment status of the monitoring device is determined from the server;
    activating a global positioning system (GPS) to determine if the vehicle is within the geofence of the trip starting location while the cellular network is turned-off; and
    deactivating the GPS after determining if the vehicle is within the geofence of the trip starting location.

11. The system of claim 10, wherein the cellular network is turned on and off and the GPS is activated and deactivated for power optimization to automatically start and stop the monitoring device.

12. The system of claim 10, wherein the trip assignment status of the monitoring device includes a positive status when a trip is assigned to the monitoring device and a negative status when no trip is assigned to the monitoring device.

13. The system of claim 12, wherein the determination of the vehicle within the geofence of the trip starting location is performed only when the trip assignment status of the monitoring device corresponds to the positive status.

14. The system of claim 10, wherein the first sensor is an accelerometer and the second sensor is a gyroscope.

15. The system of claim 10, wherein the automatic start of the monitoring device initiates real-time monitoring of one or more parameters inside the temperature-controlled unit placed inside the vehicle, and wherein the monitoring device is placed inside the temperature-controlled unit.

16. The system of claim 10, wherein:
    the communication unit configured to communicate with the server on detection of the halt to determine a trip arriving status of the monitoring device;
    the determination unit configured to determine if the vehicle is within a geofence of a trip destination location based on the trip arriving status of the monitoring device; and the switch configured to automatically stop the monitoring device when the vehicle is within the geofence of the trip destination location.

17. A non-transitory computer readable medium comprising a memory storing instructions executed by one or more processors, the one or more processors configured to:
   detect halt of a vehicle using a first sensor and a second sensor;
   communicate with a server after detecting the halt to determine a trip assignment status of a monitoring device placed inside the vehicle;
   determine if the vehicle is within a geofence of a trip starting location based on the trip assignment status of the monitoring device;
   determine speed of the vehicle after the vehicle is within the geo-fence of the trip starting location; and
   automatically start the monitoring device when the speed of the vehicle reaches above a pre-determined speed, wherein the monitoring device is configured to be enabled and disabled in order to start and stop monitoring of one or more parameters inside a temperature-controlled unit, such that automatically starting the monitoring devices starts monitoring the one or more parameters inside the temperature-controlled unit of the vehicle;
the monitoring device is further configured to perform:
turning-on a cellular network to communicate with the server;
turning-off the cellular network after the trip assignment status of the monitoring device is determined from the server;
activating a global positioning system (GPS) to determine if the vehicle is within the geofence of the trip starting location while the cellular network is turned-off; and
deactivating the GPS after determining if the vehicle is within the geofence of the trip starting location.

\* \* \* \* \*